United States Patent
Shih et al.

(10) Patent No.: US 7,405,790 B2
(45) Date of Patent: Jul. 29, 2008

(54) LIQUID CRYSTAL DISPLAY

(75) Inventors: Po-Sheng Shih, Yangmei Town, Taoyuari County (TW); Wei-Hsin Wang, Yangmei Town, Taoyuari County (TW)

(73) Assignee: Hannstar Display Corporation, Taipei (TW)

( * ) Notice: Subject to any disclaimer, the term of this patent is extended or adjusted under 35 U.S.C. 154(b) by 289 days.

(21) Appl. No.: 11/325,072

(22) Filed: Jan. 3, 2006

(65) Prior Publication Data

US 2007/0153186 A1 Jul. 5, 2007

(51) Int. Cl.
*G02F 1/1337* (2006.01)

(52) U.S. Cl. .................. 349/129; 349/139; 349/142

(58) Field of Classification Search .......... 349/77, 349/78, 80, 81, 82, 83, 87, 143, 144, 129, 349/139, 142
See application file for complete search history.

(56) References Cited

U.S. PATENT DOCUMENTS

| 5,781,261 | A | * | 7/1998 | Ohta et al. ............... 349/111 |
|---|---|---|---|---|
| 6,177,968 | B1 | * | 1/2001 | Okada et al. ............. 349/38 |
| 6,680,772 | B2 | * | 1/2004 | Lee ........................ 349/141 |
| 6,803,981 | B2 | | 10/2004 | Lee et al. ................. 349/129 |
| 6,927,828 | B2 | | 8/2005 | Shih et al. ............... 349/143 |
| 2001/0040656 | A1 | | 11/2001 | Na et al. |
| 2002/0030782 | A1 | * | 3/2002 | Lee ........................ 349/143 |
| 2007/0153186 | A1 | * | 7/2007 | Shih et al. ............... 349/129 |

* cited by examiner

*Primary Examiner*—Brian M Healy
(74) *Attorney, Agent, or Firm*—Haverstock & Owens LLP (57) ABSTRACT

For overcoming the disclination issue existing in the wing region of the electrode of the vertical alignment (VA) liquid crystal display (LCD), an improved LCD having a novel pixel structure is provided. The provided liquid crystal display includes a first substrate having a first electrode thereon and at least a second substrate having a second electrode with at least a opening thereon, where the second electrode is provided with a stair pattern having plural steps corresponding to the length of a specific side thereof, so that the disclination of the LC molecules is efficiently inhibited without any additional voltage applying.

17 Claims, 6 Drawing Sheets

LIQUID CRYSTAL DISPLAY

FIELD OF THE INVENTION

The present invention relates to a liquid crystal display (LCD), especially to a vertical alignment (VA) mode LCD.

BACKGROUND OF THE INVENTION

Nowadays, there are many techniques developed for obtaining a wider viewing angle of the liquid crystal display (LCD). Among so many wide viewing angle (WVA) techniques, the vertical alignment (VA) techniques including a multi-domain vertical alignment (MVA) LCD, a patterned vertical alignment (PVA) LCD and a biased bending vertical alignment (BBVA) LCD are widely applied.

Among the mentioned VA techniques, the MVA technique utilizes the properties of the non-identical directions in arrangements and rotations of the liquid crystal (LC) molecules to increase the viewing angle and shorten the response time of the LCD. For example, the LC molecules arranged in the MVA LCD could be promoted to align in various directions by the surface prominence, such as bumps and protrusions. As for the PVA LCD, which is another application in the MVA techniques, the pixel thereof is divided into multiple domains by a patterned indium tin oxide (ITO) on the color filter (CF) substrate. Furthermore, the BBVA technique relates to adjusting the arrangements and rotations of the LC molecules in various directions by means of the electrical field provided by a further electrode, i.e. the biased electrode.

However, there are still some issues affecting the image property of the conventional multi-domain vertical alignment mode LCD, and one of which resides in the pressure mura resulting from the disclination of LC molecules. Take the BBVA LCD for example, the disclination phenomenon occurs because the LC molecules arranged in the sides of the pixel electrode paralleled to the scanning lines or data lines, i.e. the pixel wing as respectively shown in area I of FIG. 1, always tilt in conflicting directions.

Figure 2:
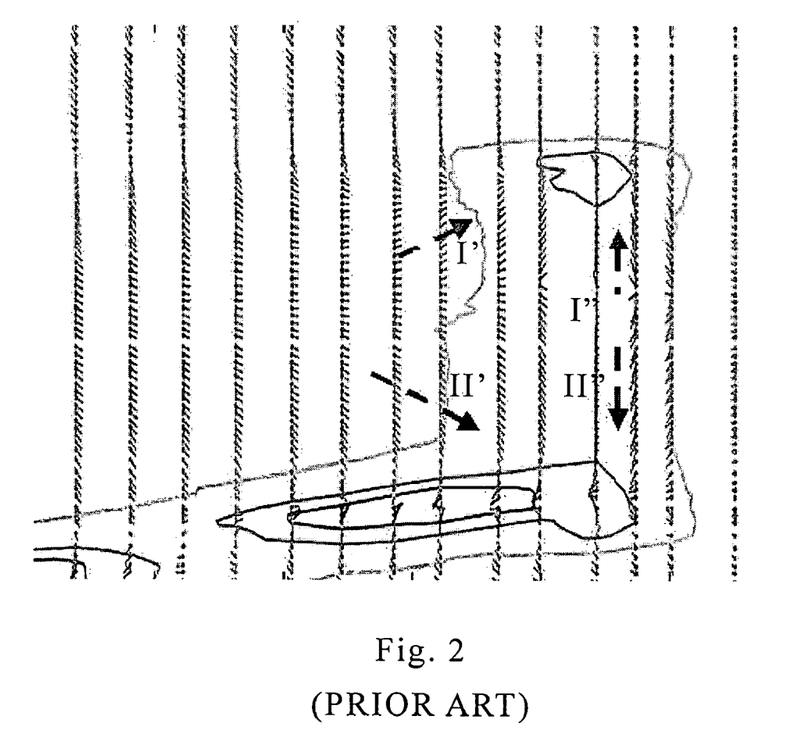
FIG. 2 is a diagram illustrating the root cause of the reverse domain of the conventional BBVA LCD and the pressure mura observed in the pixel structure thereof.

With reference to FIG. 2, which is a diagram illustrating the root cause of the reverse domain of the conventional BBVA LCD and the pressure mura observed in the pixel structure thereof, the pressure mura as shown is referred to two different cases, where one relates to the conflict of LC molecules resulting from the structure of pixel electrode, as shown in areas I" and II", and the other relates to the intrinsic shift of LC molecules accordingly, as shown in areas I' and II' thereof. As a result, the LC molecules will be aligned disclinatedly on the fringe of the overlapping field of the biased electrode and the pixel electrode of the conventional BBVA LCD, and the reverse domains and thus the pressure mura and lower transmittance would be generated correspondingly.

In order to overcome such issues of the conventional VA LCD, an improved VA LCD having a new pixel structure is provided in the present invention, whereby the disclination lines thereof would be efficiently removed and the pressure mura resulting therefrom is hence prevented.

SUMMARY OF THE INVENTION

In accordance with a first aspect of the present invention, a novel pixel for a liquid crystal display (LCD) device is provided. The LCD device is constructed of a first substrate, a second substrate opposite thereto, a first polarizer with a first transmission axis, a plurality of the novel pixels defined by a plurality of first signal lines and a plurality of second signal lines, and a liquid crystal layer sandwiched between the first substrate and the second substrate. Each of the pixels includes a first electrode formed on the first substrate and a second electrode with at least an opening formed on the second substrate. For preventing the disclination of liquid crystal (LC) molecules that happens nearby the fringe of the first and second electrodes, the second electrode is provided with at least a stair pattern on a first side thereof, which is preferably provided in a direction substantially parallel to the first transmission axis. Furthermore, the number of the steps of stair pattern is corresponding to the length of the first side of the second electrode.

In a preferred embodiment, the signal lines of the LCD device also have a respective bent pattern corresponding to the first stair pattern. The LCD device further includes a second polarizer with a second transmission axis perpendicular to the first one, and the first stair pattern is formed on a second side of the second electrode in a direction substantially parallel to the second transmission axis.

In accordance with a second aspect of the present invention, the novel pixel is also applicable for a biased bending vertical alignment (BBVA) LCD. In comparison with the mentioned embodiments, the novel pixel further includes a third electrode having at least a second stair pattern on a specific side thereof and located between the second electrode and the second substrate of the LCD. The second stair pattern is characterizing in being complementary to the first one formed on the second electrode. Similarly, the number of the steps of second pattern is corresponding to the length of the specific side of the third electrode.

In accordance with a third aspect of the present invention, the first stair pattern is formed on a first side of the second electrode in a direction substantially parallel to one of the first signal lines and the second signal lines of the LCD device. Preferably, the first side of the second electrode is located nearby one of the signal lines, and the first stair pattern is further formed on a specific side of the opening of the second electrode. Preferably, the first stair pattern is formed on a specific side of the opening of the second electrode.

In accordance with a fourth aspect of the present invention, the first stair pattern of the second electrode has a first subside so that the liquid crystal molecules are tilted by an electric field applied by the first and second electrodes in a direction perpendicular thereto.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3A:
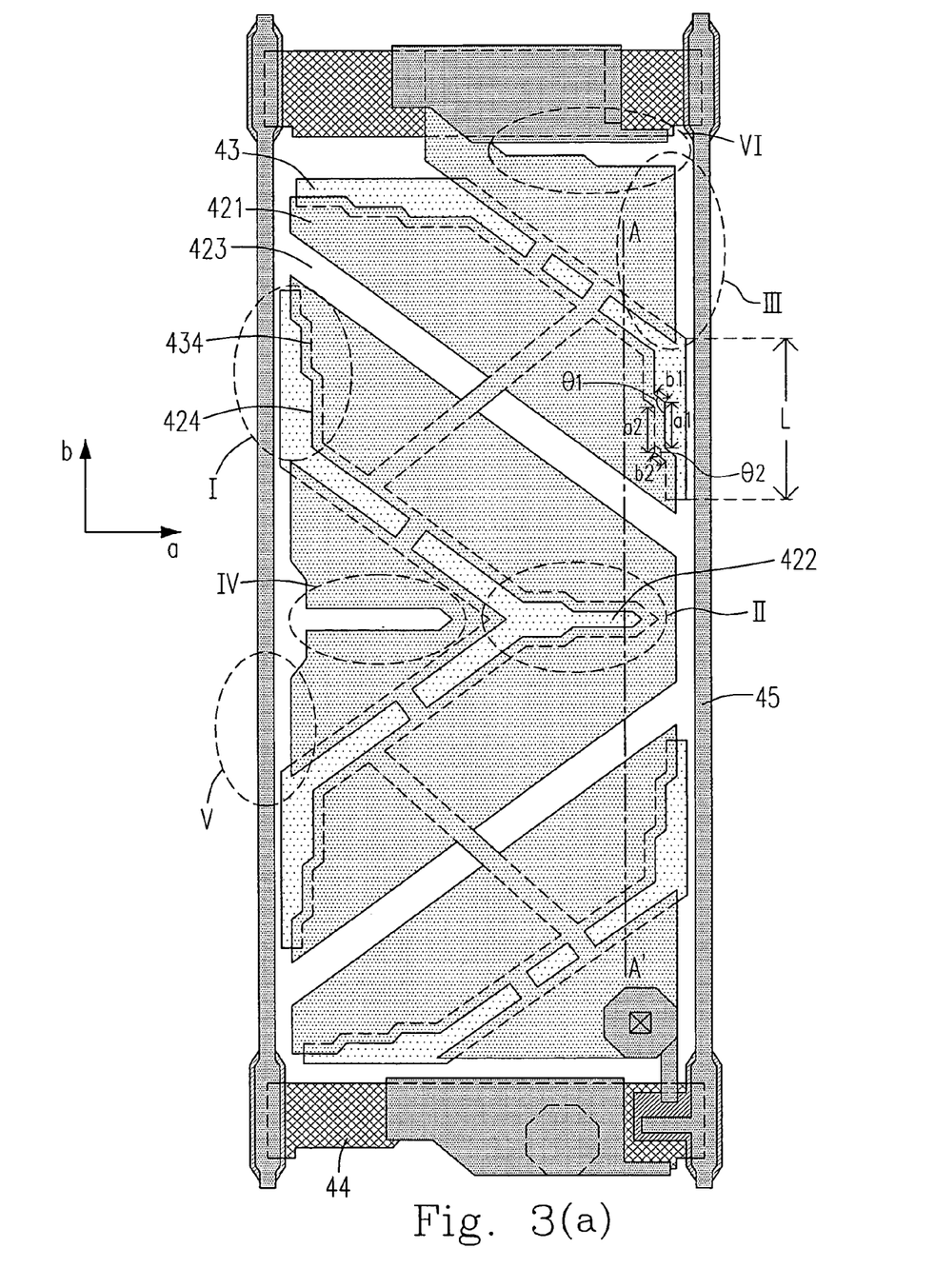
FIGS. 3(a)~3(d) are diagrams schematically illustrating the structure and the optical property of an improved BBVA LCD according to a second preferred embodiment of the present invention.
Figure 3B:
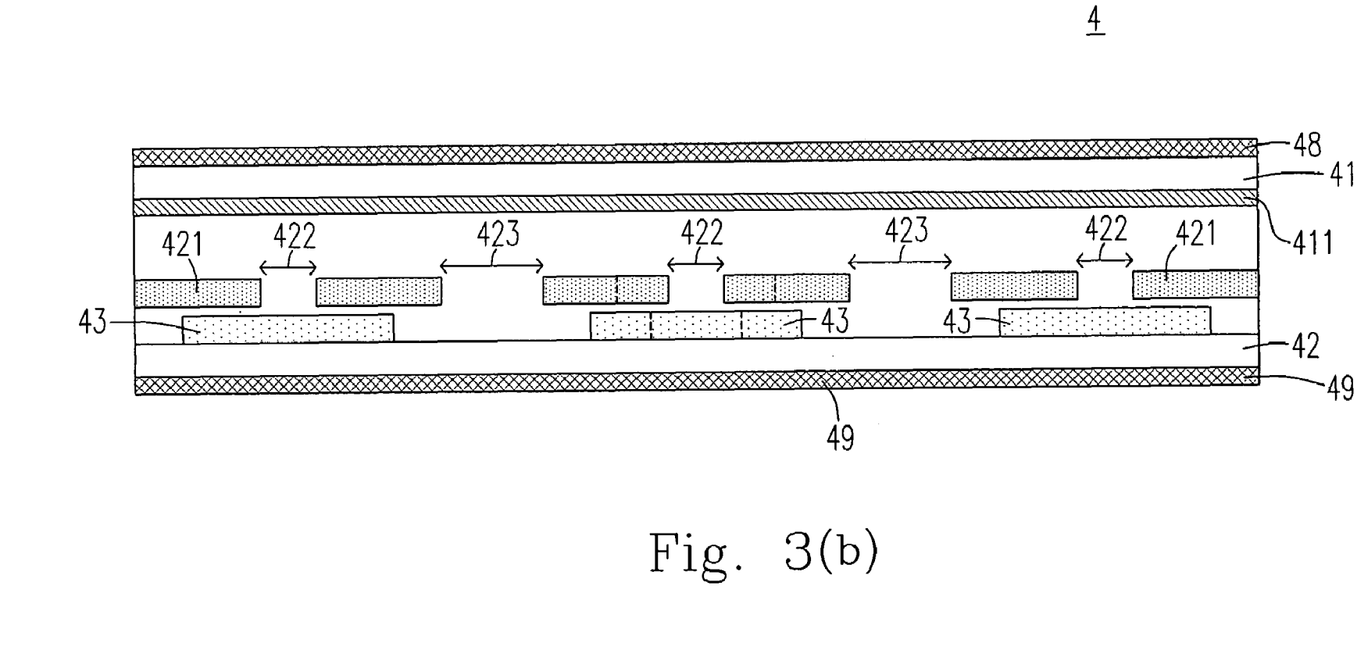

Please refer to FIG. 3(a), which is a top view showing the structure of an improved BBVA LCD according to a first preferred embodiment of the present invention. Also, please refer to 3(b), which is the cross-sectional view according to the line A-A' shown in FIG. 3(a). The LCD 4 provided in the present invention is mainly constructed of a first substrate 41, a second substrate 42 and an LC layer 40 located therebetween. Moreover, a first polarizer 48 and a second polarizer 49 are attached on the outward surfaces of the first and second substrates 41 and 42, respectively. The LCD 4 includes plural scanning lines 44 and data lines 45 which are made of metal and interlaced, so as to define a pixel area therefor. Regarding each of the pixel areas, the first electrode 411, i.e. the common electrode, and the second electrode 421, i.e. the pixel electrode, are respectively located on the first substrate 41 and the second substrate 42, and face to each other. The second electrode 421 further has at least an elongated opening 422 and a plurality of slits 423. The slits 423 are located on both sides of the longitudinal direction of the elongated opening 422, and divide the second electrode 421 into plural sub-electrodes, respectively. The third electrode 43, i.e. the biased electrode for the LCD 4, has a larger width than that of the elongated opening 422 and is located between the second substrate 42 and the second electrode 421. Additionally, the third electrode 43 is further located below the elongated opening 422 and has a longitudinal direction parallel to that thereof.

Thus, the LC molecules would be aligned and rotated in various directions due to the functions of the second electrode 421 and the third electrode 43, and the effect of multi-domain division is hence achieved.

Figure 1:
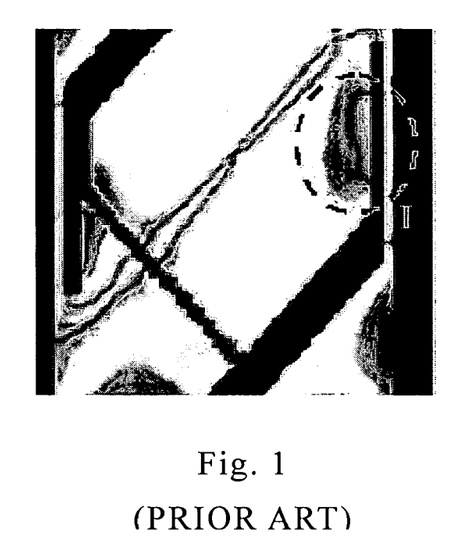
FIG. 1 is a diagram showing the simulation result for the disclination of the LC molecules of the conventional BBVA LCD according to the prior art.

There are plural wing areas including pixel wings and $V_{bias}$ wings, e.g. the respective wing areas I, II, III, IV, V and VI. The $V_{bias}$ wings relate to the areas formed in the respective overlapping regions of the second electrode 421 and the third electrode 43, while those formed on edge of the second electrode 421 are termed as pixel wings. Due to the disclination phenomenon happened in the wing area of the biased electrode, as shown in FIG. 1, in this embodiment, in the wing area I of the second electrode 421 and the third electrode 43, a first stair pattern 424 containing plural first steps is formed on the pixel wing and the $V_{bias}$ wing thereof. As shown in FIG. 3(a), each of the first steps has a first sub-side with a first length a1, a second sub-side with a second length b1 and a first angle θ1 defined therebetween. Furthermore, in this embodiment, a second stair pattern 434 containing plural second steps is formed on the $V_{bias}$ wing of the second electrode 421 and the third electrode 43. Similarly, each of the second steps has a third sub-side of a third length a2, a fourth sub-side of a fourth length b2 and a second angle θ2 defined therebetween, as shown in FIG. 3(a).

Preferably, the first length a1 and the third length a2 are respectively ranged from 1 μm to 20 μm, and the second length b1 and the fourth length b2 are respectively ranged from 1 μm to 10 μm. Besides, the first angle θ1 and the second angle θ2 are respectively ranged from 90° to 180°, preferably. In addition, the number of steps of the stair pattern depends on the length of wing for achieving the purpose of the present invention. That is, more steps need to be formed on the respective wing of the electrode if the length of wing L is larger. For example, if the length of wing L is 30 μm, the number of the steps is preferably 2 and the first length a1 and the third length a2 are respectively 12 μm, the second length b1 and the fourth length b2 are respectively 2.5 μm, and the first angle θ1 and the second angle θ2 are respectively 135°, preferably.

Furthermore, the direction of the third sub-side and the first sub-side are preferred respectively and substantially parallel to one of the direction of the scanning lines 44 and the data lines 45. Please refer to FIG. 3(a), in the wing area VI, the first steps of the first stair pattern 424 of the second electrode 421 have one sub-side extending to the same direction of the scanning lines 44. Similarly, the first steps of the first stair pattern 424 of the second electrode 421 in the wing area I respectively have at least one sub-side extending to the same direction of the data lines 45. Thus, one sub-side of the first steps of the first stair pattern 424 of the second electrode 421 could be extending to the direction of one of the signal lines. In addition, the first stair pattern 424 of the second electrode 42 and the second stair pattern 434 of the third electrode 43 would be complementary to each other. However, no matter the third electrode 43 has the second stair pattern 434 or not, the side or one sub-side of the third electrode at the overlapping area of the second electrode 421 and the third electrode 43 of $V_{bias}$ wings areas would be substantially parallel to one of the signal lines, such as the data lines 45 and the scanning lines 44. That is to say, the second stair pattern 434 of the third electrode 43 also could be different from the first stair pattern 424 of the second electrode 421.

Please now refer to FIG. 3(a) and FIG. 3(b) as well. In more details, an upper polarizer 48 with an upper transmission axis "a" is arranged outside the upper substrate 41, whereas a lower polarizer 49 with a lower transmission axis "b" is disposed outside the lower substrate 42, as shown as FIGS. 3(a) and 3(b). The polarizers 48 and 49 are arranged in such a way that the transmission axis "a" of the upper polarizer 48 on the upper substrate 41 and the transmission axis "b" of the lower polarizer 49 on the lower substrate have a predetermined relationship with each other, where the light emitted from the lower polarizer 49 can be modulated by a change in the orientation state of the liquid crystal with an electric field applied between the first electrode 411 and the second electrode 421 that are provided on the lower substrate 42. Thus, the first stair pattern 424 of the second electrode 421 and the second pattern 434 of the third electrode 43 are formed in a direction substantially parallel to one of the transmission axis "a" of the upper polarizer 48 and the transmission axis "b" of the lower polarizer 49, where in a common case, the respective transmission axes of the upper and lower polarizers 48 and 49 are substantially perpendicular to each other. Depending on the disired product design, however, the arrangement orientation of polarizers 48 and 49 is adjustable so that the respective transmission axes thereof may be changed to the respective directions "a" or "b". In addition, a backlight (not shown) is arranged on the lower surface side of the lower substrate 42.

Figure 3C:
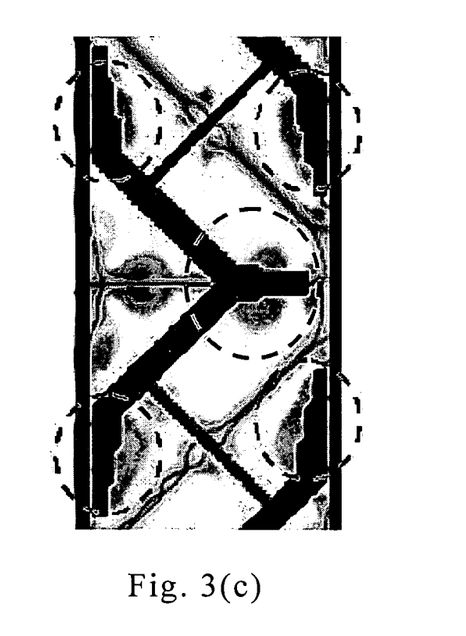
Figure 3D:
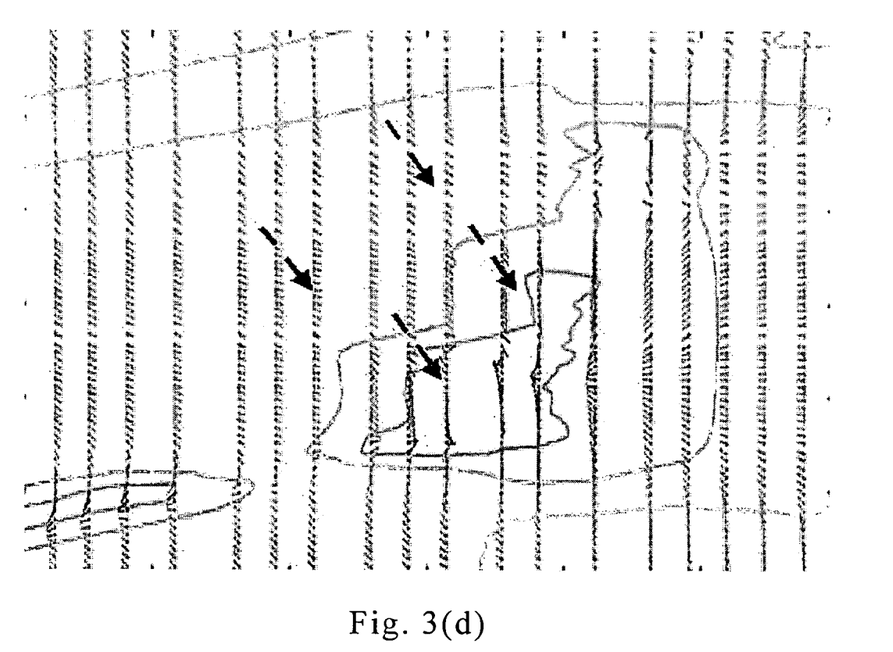

In this embodiment, problems of the disclination of the LC molecules in the wing areas and the pressure mura resulting therefrom are effectively overcome, as shown in FIGS. 3(c) and 3(d), respectively. In accordance with FIG. 3(c), which illustrates the experimental result for the disclination of the LC molecules, it is apparent that there is no disclination lines existing in the region nearby the $V_{bias}$ wing of the biased electrode and the reverse domain is sufficiently removed by the introduction of the stair patterns thereon. Also, as shown FIG. 3(d), it is easily observed that all of the LC molecules twist in the same direction by the introduction of the stair patterns, and pressure mura issue is successfully dealt with thereby.

Figure 4:
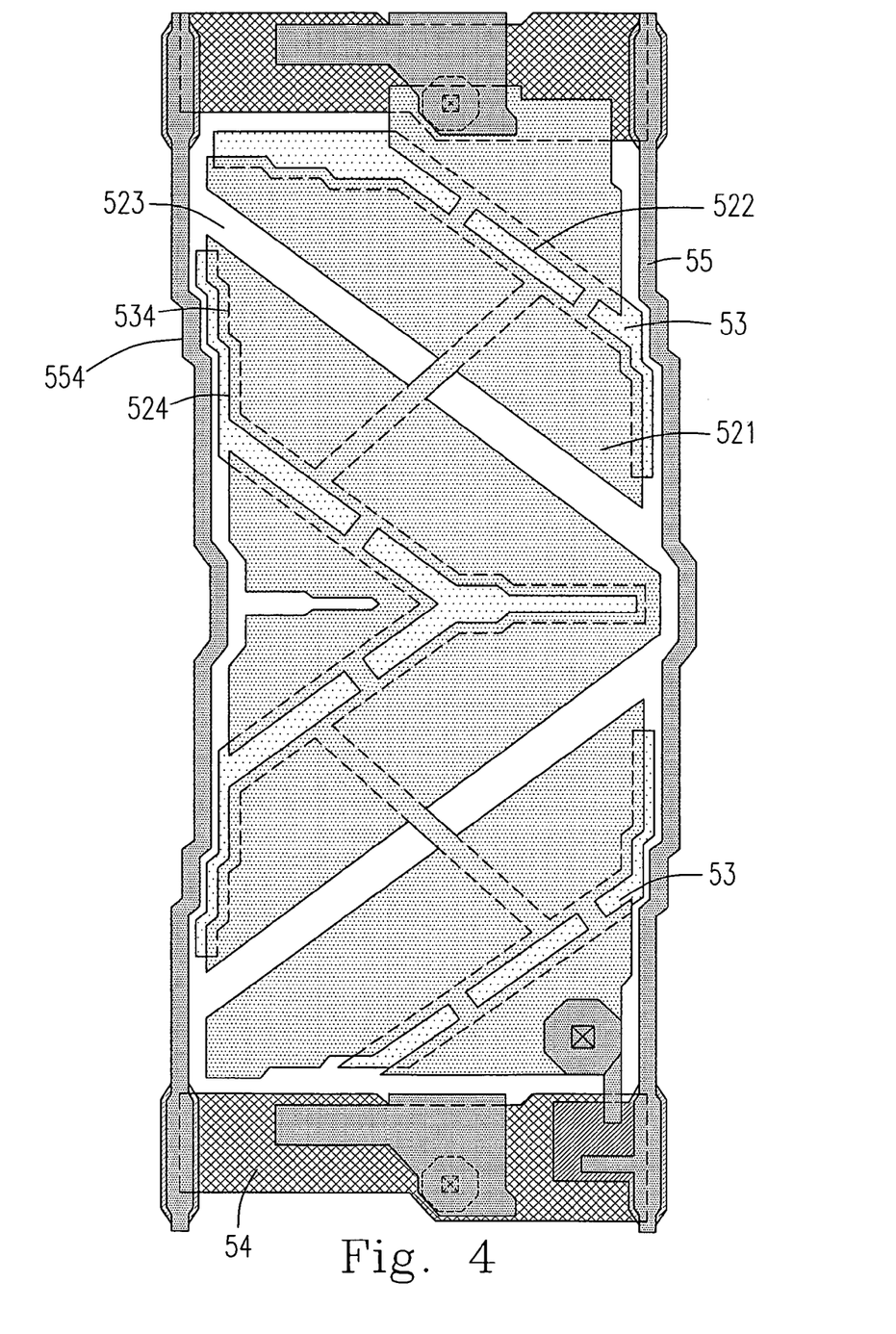
FIG. 4 is a diagram showing the structure of an improved BBVA LCD according to a second preferred embodiment of the present invention.

Please refer to FIG. 4, which is a top view showing the structure of an improved BBVA LCD according to a second preferred embodiment of the present invention. Similarly, within the pixel area that is defined by the interlaced scanning lines 54 and data lines 55 made of metal, the second electrode 521, i.e. the pixel electrode for the BBVA LCD 5, further has at least an elongated opening 522 and a plurality of slits 523, which are located on both sides of the longitudinal direction of the elongated opening 522 and divide the second electrode 521 into plural sub-electrodes, respectively. The third electrode 53, i.e. the biased electrode for the LCD 5, has a larger width than that of the elongated opening 522 and is located below the elongated opening 522 and has a longitudinal direction parallel to that thereof. On the respective wing areas of the second electrode 521 and the third electrode 53, i.e. the pixel wing and the $V_{bias}$ wing, a first stair pattern 524 containing plural first steps and a second stair pattern 534 containing plural second steps are respectively formed. Moreover, there is a bent pattern 554 further formed on the data lines 55, as shown in FIG. 4.

Wherein the first stair pattern 524 of the second electrode 521 and the second stair pattern 534 of the third electrode 53 in the $V_{bias}$ wing are complementary to each other and match the bend pattern 554 of the data lines 55 nearby. In more details, the data lines 55, the BM layer and the color resin (not shown) are bent correspondingly to the second and the third electrodes 521 and 53, so as to be parallel to each of the steps formed on the wing areas thereof. In this case, the aperture ratio of the LCD would be sufficiently improvable.

It is worthy to be mentioned that the novel pixel structure according to the present invention is further applicable for the conventional vertical alignment (VA) mode LCD, including the multi-domain vertical alignment (MVA) LCD and the patterned vertical alignment (PVA) LCD. In this case, within the pixel area defined by the interlaced scanning lines and data lines the pixel electrode on the lower substrates could be also provided with a stair pattern, so as to prevent the LC molecules from shifting and conflicting thereon.

Figure 5A:
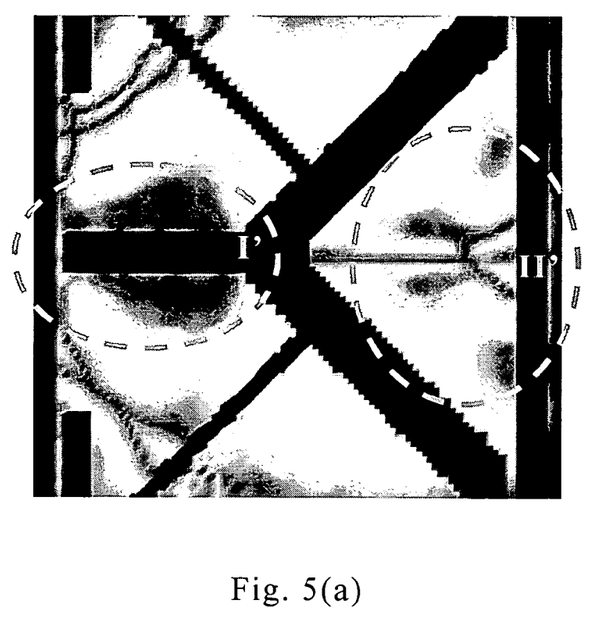
FIGS. 5(a) and 5(b) are diagrams showing the optical simulation result of the conventional BBVA LCD and the optical simulation result of the improved BBVA LCD according to the present invention, respectively.
Figure 5B:
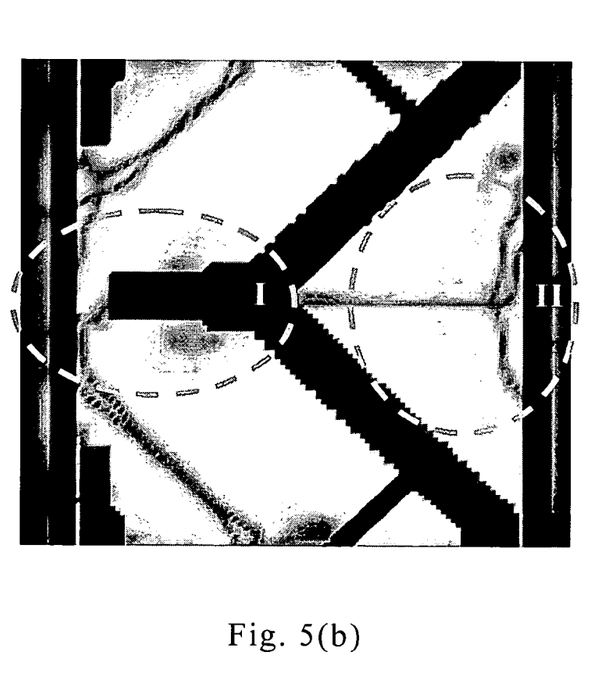

A further comparison between the respective optical property of the conventional VA LCD and the improved VA LCD according to the present invention is shown in FIGS. 5(a) and 5(b), wherein FIG. 5(a) is a diagram showing the optical simulation result of the conventional VA LCD and FIG. 5(b) is a diagram showing the optical simulation result of the improved VA LCD according to the present invention.

As shown in FIG. 5(a), it is apparent that there is a reverse domain existing in the region nearby the wing of the biased electrode, i.e. the so-called third electrode in the present invention. Such reverse domains would further result in a pressure mura and affect the image quality of the LCD. It is believed that the reverse domains are generated from the disclination lines which are caused by the LC molecules tilting in conflicting directions nearby the wing of the biased electrode.

As shown in FIG. 5(b), it is apparent that the disclination lines nearby the wing of the biased electrode, the region I, are sufficiently removed through the designed stair pattern formed thereon, and hence the reverse domain is also entirely eliminated therefrom. Furthermore, in comparison with the wing region II' as shown in FIG. 5(a), the improved BBVA LCD according to the present invention is also advantageous in that the wing area with a stair pattern results in an enhanced brightness thereof, e.g. the wing region II as shown in FIG. 5(b). It is believed that the plural steps of the stair pattern could provide a sufficient force to make the LC molecules tilt at a designed angle, e.g. 45° and/or 135° in the mentioned embodiment, which accounts for the elimination of the disclination lines. Furthermore, such pixel structure provided in the present invention also helps a lot in the LC recovery and the improvement in aperture ratio, so that the image quality, the lightness and the light transmission efficiency of the LCD are greatly enhanced, which could be apparently observed from FIGS. 5(a) and 5(b).

Based on the above, the present invention removes the disclination of the LC molecules on the wing of the electrode in the conventional VA LCD including the multi-domain vertical alignment (MVA) LCD, the patterned vertical alignment (PVA) LCD, and the biased bending vertical alignment (BBVA) LCD. By introducing the stair pattern in the pixel electrode of the LCD, the disclination of the LC molecules is efficiently inhibited without any additional voltage applying. That is to say that a LCD with high quality of the image and good ability in light transmission is obtained. Hence, the present invention not only has novelty and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display device having a first substrate, a second substrate opposite thereto, a first polarizer with a first transmission axis, a plurality of pixels defined by a plurality of first signal lines and a plurality of second signal lines, and a liquid crystal layer sandwiched between said first substrate and said second substrate, and each of said pixels comprising:
   a first electrode formed on said first substrate; and
   a second electrode with at least an opening and at least a stair pattern formed on said second substrate;
   wherein said stair pattern is formed on a first side of said second electrode in a direction substantially parallel to said first transmission axis, wherein said first side has a length and said stair pattern has a number of first steps corresponding to said length and each said first step has a first sub-side, a second sub-side and a first angle therebetween, wherein said first sub-side has a first length ranged from 1 µm to 20 µm, said second sub-side has a second length ranged from 1 µm to 10 µm, and said first angle is ranged from 90° to 180°.

2. The liquid crystal display according to claim 1, wherein one of said signal lines has a bent pattern corresponding to said stair pattern.

3. The liquid crystal display according to claim 1, further having a second polarizer with a second transmission axis perpendicular to said first transmission axis.

4. The liquid crystal display according to claim 3, wherein said stair pattern is formed on a second side of said second electrode in a direction substantially parallel to said second transmission axis.

5. A liquid crystal display device having a first substrate, a second substrate opposite thereto, a plurality of pixels defined by a plurality of first signal lines and a plurality of second signal lines, and a liquid crystal layer having a plurality of liquid crystal molecules and sandwiched between said first substrate and said second substrate, each of said pixels comprising:

a first electrode formed on said first substrate;

a second electrode with at least an opening and at least a first stair pattern formed on said second substrate, wherein said first stair pattern is formed on a first side of said second electrode so as to prevent the said liquid crystal molecules from disclinating; and a third electrode located between said second electrode and said second substrate, wherein said third electrode includes at least a second stair pattern formed on a specific side thereof wherein said specific side has a length and said second stair pattern has a number of second steps corresponding to said length, wherein each said second step has a third sub-side, a fourth sub-side and a second angle therebetween, wherein said third sub-side has a third length ranged from 1 μm to 20 μm, said fourth sub-side has a fourth length ranged from 1 μm to 10 μm, and said second angle is ranged from 90° to 180°.

6. The liquid crystal display according to claim 5, wherein said first stair pattern of said second electrode and said second stair pattern of said third electrode are complementary to each other.

7. The liquid crystal display according to claim 6, wherein one of said signal lines has a bent pattern corresponding to said first stair pattern.

8. The liquid crystal display according to claim 5, wherein one of said signal lines has a bent pattern corresponding to said first stair pattern.

9. The liquid crystal display according to claim 5, wherein said fourth sub-side is parallel to a second side of said second electrode.

10. The liquid crystal display according to claim 5, wherein said first side of said second electrode is located nearby one of said signal lines.

11. A liquid crystal display device having a first substrate, a second substrate opposite thereto, a plurality of pixels defined by a plurality of first signal lines and a plurality of second signal lines, and a liquid crystal layer sandwiched between said first substrate and said second substrate, each of said pixels comprising:

a first electrode formed on said first substrate; and a second electrode with at least an opening and at least a first stair pattern formed on said second substrate, wherein said first stair pattern is formed on a first side of said second electrode in a direction substantially parallel to one of said first signal lines and said second signal lines, wherein said first side of said second electrode has a length and said first stair pattern has a number of first steps corresponding to said length, wherein each said first step has a first sub-side, a second sub-side and a first angle therebetween, wherein said first sub-side has a first length ranged from 1 μm to 20 μm, said second sub-side has a second length ranged from 1 μm to 10 μm, and the first angle is ranged from 90° to 180°.

12. The liquid crystal display according to claim 11, wherein said first side of said second electrode is located nearby one of said signal lines.

13. The liquid crystal display according to claim 12, wherein said first stair pattern is further formed on a specific side of said opening of said second electrode.

14. The liquid crystal display according to claim 11, wherein said first side of said second electrode is a specific side of said opening of said second electrode.

15. A liquid crystal display device having a first substrate, a second substrate opposite thereto, a plurality of pixels defined by a plurality of first signal lines and a plurality of second signal lines, each said pixel comprising:

a first electrode formed on said first substrate;

a second electrode with at least an opening and at least a first stair pattern on a first side thereof formed on said second substrate; and a plurality of liquid crystal molecules sandwiched between said first substrate and said second substrate, wherein said first stair pattern of said second electrode has a first sub-side so that said liquid crystal molecules are tilted by an electric field applied by said first and second electrodes in a direction perpendicular thereto.

16. The liquid crystal display according to claim 15, wherein said first side of said second electrode has a length, and the number of said first-sides is corresponding thereto.

17. A liquid crystal display device having a first substrate, a second substrate opposite thereto, a first polarizer with a first transmission axis, a plurality of pixels defined by a plurality of first signal lines and a plurality of second signal lines, and a liquid crystal layer sandwiched between said first substrate and said second substrate, each said pixel comprising:

a first electrode formed on said first substrate; and a second electrode with at least an opening and at least a stair pattern formed on said second substrate;

wherein said stair pattern is formed on a first side of said second electrode in a direction substantially parallel to said first transmission axis, where a second polarizer with a second transmission axis is perpendicular thereto.

* * * * *